Sept. 27, 1966   G. H. MORRIS   3,275,086
SPRING RELEASE LOCKING ATTACHMENT FOR CULTIVATOR SHANKS
Filed Feb. 26, 1964   2 Sheets-Sheet 1
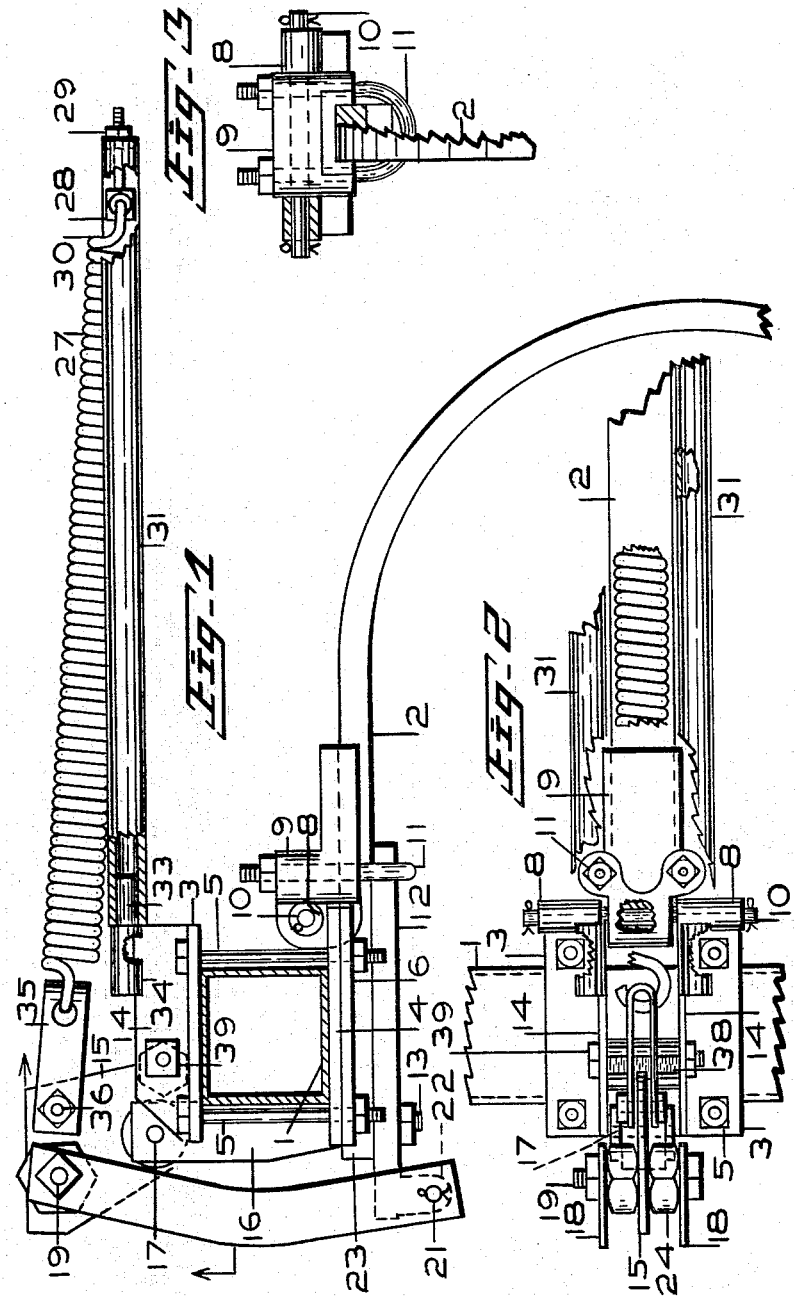

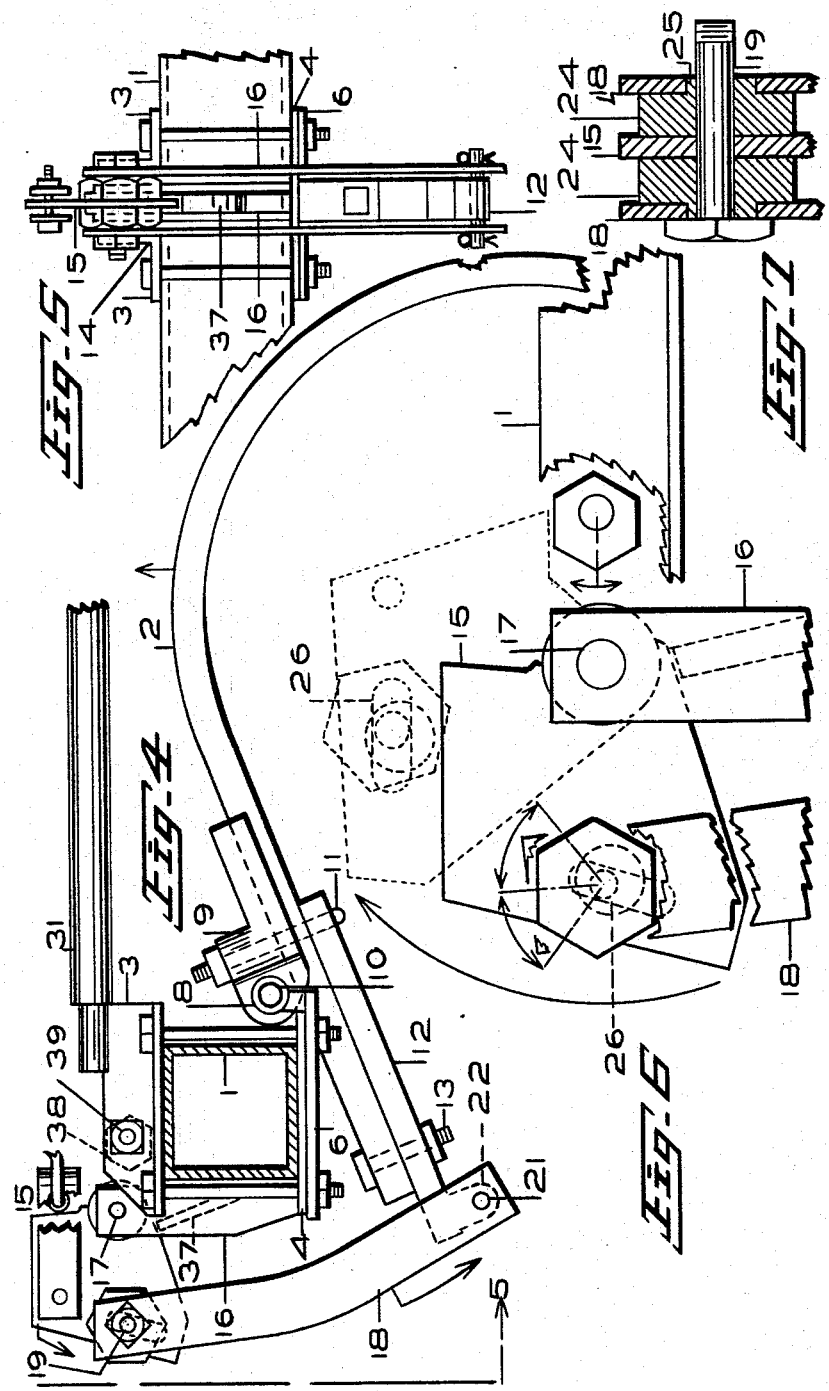

United States Patent Office 3,275,086
Patented Sept. 27, 1966

3,275,086
SPRING RELEASE LOCKING ATTACHMENT FOR CULTIVATOR SHANKS
George Henry Morris, 37 6th Ave. N., Yorkton, Saskatchewan, Canada
Filed Feb. 26, 1964, Ser. No. 347,431
7 Claims. (Cl. 172—266)

This invention relates to cultivator shank mountings and has particular reference to a spring release mounting for the shank, and including a locking connection between the spring release and shank.

In the art to which the invention relates, cultivator shanks require to be held by springs or other cushioning means in working relation with the soil being cultivated, but capable of rearward and upward movement when an obstruction is encountered by the soil working point on the shank.

The present invention is concerned with improvements in spring release cultivator shank mountings, more particularly for use in deep tillage cultivating, and includes locking means holding the shank against rearward and upward movement unless an obstruction is encountered that may cause damage to the shank or point, in which event the spring release will unlock, allowing the shank and point to swing rearward and upward, and when the obstruction is passed the shank and point will return to a normal working position.

The attachment also includes means for adjustment of the spring release to vary the spring tension opposing a rearward and upward movement of the shank, and also adjustment of the locking means to vary the leverage the shank has against the spring release, and also to compensate for wear in the connections between the shank and spring release elements.

Other features and advantages of the invention will become apparent by reference to the accompanying description taken in conjunction with the drawings.

In the drawings, wherein is illustrated a preferred embodiment of the invention, FIG. 1 is a side view of a cultivator shank mounting in accordance with my invention, shown with the shank in normal working position, and with the shank and other parts broken away and parts in vertical section.

FIG. 2 is a top plan view of the spring release elements for the shank, with the cultivator frame bar and the spring mounting shown broken away.

FIG. 3 is a rear end view of the pivotal mounting for the shank, with the shank largely broken away and parts of the pivotal mounting in vertical section.

FIG. 4 is a side view of the cultivator shank mounting, shown with the shank raised, as when avoiding an obstruction, with the frame bar of the cultivator shown in vertical section and the spring and mounting therefor broken away.

FIG. 5 is a front end view of the shank and mounting, taken on a line 5—5 of FIGURE 4, with only the mounting end of the shank indicated, and with the cultivator frame bar shown broken away.

FIG. 6 is an enlarged side view, with parts broken away, showing the attachment of the rocker plate on the frame bar engaging bracket in position it would be with the shank raised, and including the shank connecting link, and with the position of the rocker plate when the shank is in normal working position shown in dashed lines.

FIG. 7 is an enlarged side view showing the adjustable attachment of the shank connecting links to the rocker plate, with parts other than the attaching plate shown in vertical section and broken away.

Having reference to the drawings, at 1 is indicated a cross frame bar of a cultivator on which shanks carrying soil working points are mounted, a fragment of such a shank being indicated at 2.

Attached on the frame bar are upper and lower plates 3 and 4 connected by bolts 5 and forming a bracket to which the working elements of the shank mounting are attached. The lower plate 4 is reinforced by straps 6 (FIG. 1) and fixed, as by welding, to the rear upper side of the plate 4 are sleeves 8 to which attaches a shank mounting element 9 on a pin 10 that engages in the sleeve 8 for each side of the shank mounting element. The shank 2 is held in the mounting element 9 by a U clamp 11, and this clamp rearwardly engages a bracket 12 (FIGS. 1 and 4) that is forwardly attached to the shank by a bolt 13.

The lower plate 4 includes integral upstanding arms 16 (FIGS. 1, 2 and 5) between which is pivotally mounted a rocker plate 15 on a pin 17, for tipping movement.

To the rocker plate pivotally attach links 18 on a bolt 19. The mounting of the rocker plate includes spacing elements 24. The links 18 connect by a pin 21 to a depending lug 22 on the bracket 12.

It is necessary for the proper functioning of the shank mounting to have the forward end 23 (FIG. 1) of the shank firmly up against the lower mounting plate 4 when the shank is in soil working position, and for this the spacers 24 are eccentric (FIGS. 6 and 7) and have end portions 25 engaging the links 18 by which wear in the connection of the links to the bolts 19 and pins 21 can be compensated for by turning the spacers 24. The rocker plate 15 includes a slot 26 (FIG. 6) in which the bolt 19 is engaged, permitting adjustment of the bolt forward or backward in the slot by loosening the nut on the bolt and moving the bolt and links. This permits varying the vertical alignment between the bolt 19 and pin 21. The farther the bolt 19 is moved rearward in the slot 26 the nearer it approaches, or passes rearwardly, a vertical alignment with the pin 21, as in the present showing of FIGURE 1, and the more securely the shank will be locked against initial rearward and upward movement. When the bolt 19 is moved forward in the slot 26 it becomes easier for the shank to unlock and start its movement upward. The result is to provide a variation in the pressure required against the shank before it will rise, disengaging from the locking action imposed by the links 18 and plate 15.

The spring release for the cultivator shank consists of a spring 27 having its rear end engaged by an eye bolt 28 attached to the rear end of a bracket 30 held by a nut 29, the bracket 30 having its forward end fixed to the wings 14 of the plates 3. The bracket includes tubular sides 31 and engages reduced ends 33 of shank elements 34 that are fixed, as by welding, to the wings. The forward end of the spring 27 has a hooked engagement with a U shaped link 35 attached by a bolt 36 to the rocker plate 15.

The rocker plate 15 has its forward tipping movement limited by a stop 37 (FIGS. 4 and 5) secured, as by welding, to the arms 16 between the arms.

Rearward tipping movement of the rocker plate is limited by an eccentric octagonal block 38 mounted on a clamping bolt 39 between the wings 14. By loosening the bolt the block may be turned to increase or decrease the permissible backward movement of the rocker plate 15, this serving as additional spring release adjustment in respect to downward movement and soil penetration of a point on the shank 2.

In the use of the device, a series of shanks would be used, each shank and associated assembly of parts having a separate mounting on a cross bar or bars of the cultivator. These ranks are each normally held, as is apparent by reference to FIGURE 1, by the links 18 that engage the forward depending lugs 22 of the shanks by the pins 21 and the rocker plate by the bolt 19. This arrangement locks the shanks against upward movement unless the shanks encounter a firm obstruction necessitating rise of the shank or shanks to avoid damage, when the greater pressure imposed on the shanks rearward and upward by the obstruction breaks the lock of the links 18 and the shank rises cushioned by the spring 27.

So long as the shank is held against rising even cultivating by a point carried by the shank will result, but where an obstruction is encountered, such as a stone that is sufficiently embedded in the ground to require the shank to rise to clear it the shank may do so with resulting expansion of the spring 27, which, when the obstruction is cleared returns the shank to its normal working position.

What I claim is:

1. In a spring release mounting for a cultivator shank, the cultivator including a cross frame bar to which the shank is attached, a bracket on the cross frame bar, means rearwardly pivotally attaching the shank to the bracket with the shank suspended below and projecting forwardly of the bracket, a rocker plate pivotally mounted on the cross frame bar bracket vertically disposed and projecting upwardly and forwardly of the bracket, links pivotally attaching to the upper forward portion of the rocker plate, means pivotally attaching the links to the shank forwardly of the frame bar bracket, a spring mounting bracket on the cross frame bar bracket projecting rearwardly, and an expansion spring rearwardly anchored to the rearwardly projecting bracket and forwardly connected to the rocker plate, and by which upward movement of the shank rear portion by the link connection of its forward portion with the rocker plate pivots the rocker plate forward and the movement of the shank is thereby opposed by said spring.

2. A spring release as set out in claim 1 in which the spring mounting bracket includes tubular side bars and means lengthwise connecting the side bars, tubular elements fixed on the cross frame bar bracket, said elements having rearward portions concentrically engageable with the tubular side bars, and the attachment of the spring to the spring mounting bracket includes means for endwise adjustment to vary the tension of the spring.

3. A spring release mounting as set out in claim 1 in which the pivotal attachment of the links to the rocker plate includes a bolt, the links having openings therein for engagement by said bolt and the rocker plate having an elongated opening adapted to be brought into register with the link openings, said elongated opening extending horizonally when the shank is in cultivating relation to the ground and by which the rearward adjustment of the bolt in the elongated opening increases the upward pressure required against the shank to cause the shank to rise and forward adjustment of the bolt decreases the pressure required.

4. A spring release mounting for a cultivator shank, comprising: a cultivator cross bar; an upper plate and a lower plate clamp-mounted on said cross bar; means pivotally attaching the front end of said cultivator shank to the rear of said lower plate; a front extension bracket on said shank, projecting past said cross bar; a rocker plate forwardly and pivotally mounted on said upper plate for tipping movement thereon; vertically disposed links pivotally connecting the front of the rocker plate with the front end of said extension bracket; a horizontal bracket projecting rearwardly from said upper plate; and spring means interposed between the rear end of said horizontal bracket and said rocker plate, for resiliently opposing the tipping of said rocker plate by pressure from said cultivator shank.

5. A spring release as set out in claim 4 in which the pivotal attachment of the links to the rocker plate includes a connecting bolt and eccentric means on the bolt by which vertical adjustment of the connection between the links and rocker plate may be made.

6. A spring release as set out in claim 4 in which the pivotal mounting of the shank on the frame bar bracket includes a plate attached to the under side of the shank projecting forwardly of the frame bar bracket, said plate having a depending lug at its forward end to the lower end portion of which lug the links pivotally attach.

7. A spring release as set out in claim 4 and including a stop comprising a block eccentrically mounted on the cross bar upper plate and against which the rocker plate rests at the rearward end of its tipping movement, said block being rotatable to vary the permissible rearward movement of the rocker plate.

References Cited by the Examiner

UNITED STATES PATENTS

| | | | |
|---|---|---|---|
| 545,987 | 1/1895 | Van Brunt | 172—267 |
| 1,639,768 | 8/1927 | Gallagher | 172—268 |
| 2,777,768 | 1/1957 | Hunter | 172—710 |
| 2,944,613 | 7/1960 | Anderson | 172—266 |

ABRAHAM G. STONE, *Primary Examiner.*

J. R. OAKS, *Examiner.*